US011743723B2

(12) United States Patent
Angelov et al.

(10) Patent No.: US 11,743,723 B2
(45) Date of Patent: Aug. 29, 2023

(54) PREDICTIVELY PROVIDING ACCESS TO RESOURCES

(71) Applicant: MicroStrategy Incorporated, Vienna, VA (US)

(72) Inventors: Konstantin Angelov, Fairfax, VA (US); Hyunmo Kang, Laurel, MD (US); Hector Vazquez, Ashburn, VA (US); Ren-Jay Huang, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 561 days.

(21) Appl. No.: 16/571,363

(22) Filed: Sep. 16, 2019

(65) Prior Publication Data

US 2021/0084494 A1 Mar. 18, 2021

(51) Int. Cl.
*H04L 47/70* (2022.01)
*H04W 12/08* (2021.01)
(Continued)

(52) U.S. Cl.
CPC .......... *H04W 12/062* (2021.01); *G06N 20/00* (2019.01); *H04L 47/823* (2013.01);
(Continued)

(58) Field of Classification Search
CPC . H04W 12/062; H04W 12/63; H04W 12/069; H04W 12/08; H04W 16/22;
(Continued)

(56) References Cited

U.S. PATENT DOCUMENTS 6,018,733 A * 1/2000 Kirsch ............... G06F 16/30
707/999.005
8,005,832 B2 8/2011 Andrieu
(Continued)

FOREIGN PATENT DOCUMENTS

WO WO-2019210024 A1 * 10/2019 ............. G06F 1/163

OTHER PUBLICATIONS

Office Action in U.S. Appl. No. 15/838,792, dated Jul. 28, 2021, 65 pages.
(Continued)

*Primary Examiner* — Farid Homayounmehr
*Assistant Examiner* — Mudasiru K Olaegbe
(74) *Attorney, Agent, or Firm* — Fish & Richardson P.C.

(57) ABSTRACT

Methods, systems, and apparatus, including computer-readable media, for predictively providing access to resources. In some implementations, a method includes receiving movement data indicating movement of a mobile device associated with a user while the mobile device approaches a resource is received. A credential of the user authorizes access to the resource. Based on the movement data, the movement of the mobile device is classified as corresponding to an attempt to access the resource. The mobile device is determined to be in proximity to the resource. Before the user interacts with the resource, the resource is caused to be unlocked or opened in response to determining that the credential of the user authorizes access to the resource, classifying the movement of the mobile device as corresponding to an attempt to access the resource, and determining that the mobile device is in proximity to the resource.

18 Claims, 5 Drawing Sheets

(51) Int. Cl.
*H04W 12/062* (2021.01)
*H04W 16/22* (2009.01)
*G06N 20/00* (2019.01)
*H04W 12/63* (2021.01)
*H04W 12/069* (2021.01)

(52) U.S. Cl.
CPC ......... *H04W 12/069* (2021.01); *H04W 12/08* (2013.01); *H04W 12/63* (2021.01); *H04W 16/22* (2013.01)

(58) Field of Classification Search
CPC .. H04W 12/67; H04W 28/0226; G06N 20/00; G06N 3/08; H04L 47/823
See application file for complete search history.

(56) References Cited

U.S. PATENT DOCUMENTS

| | | |
|---|---|---|
| 8,094,881 B2 | 1/2012 | Matsugu et al. |
| 8,200,661 B1 | 6/2012 | Pearce et al. |
| 8,260,009 B2 | 9/2012 | Du |
| 8,296,323 B2 | 10/2012 | Pollard et al. |
| 8,370,639 B2 | 2/2013 | Azar et al. |
| 8,595,810 B1 | 11/2013 | Ben Ayed |
| 8,798,336 B2 | 8/2014 | Nechyba et al. |
| 9,160,743 B2 | 10/2015 | Anantharaman |
| 9,183,281 B2 | 11/2015 | Cheng et al. |
| 9,215,321 B2 | 12/2015 | Timem |
| 9,246,898 B2 | 1/2016 | McKeeman et al. |
| 9,294,474 B1 | 3/2016 | Alikhani |
| 9,558,185 B2 | 1/2017 | Potok et al. |
| 9,721,175 B2 | 8/2017 | Kursun et al. |
| 10,163,105 B1 | 12/2018 | Ziraknejad et al. |
| 10,200,454 B1 | 2/2019 | Lewis et al. |
| 10,510,035 B2 | 12/2019 | Fadell et al. |
| 2003/0046237 A1 | 3/2003 | Uberti |
| 2006/0110011 A1 | 5/2006 | Cohen et al. |
| 2007/0186106 A1* | 8/2007 | Ting .................... H04L 63/0815 713/168 |
| 2007/0271596 A1 | 11/2007 | Boubion et al. |
| 2008/0097851 A1 | 4/2008 | Bemmel et al. |
| 2009/0199264 A1 | 8/2009 | Lang |
| 2010/0228692 A1 | 9/2010 | Guralnik et al. |
| 2011/0197166 A1 | 8/2011 | Girgensohn et al. |
| 2011/0311111 A1 | 12/2011 | Allburn |
| 2012/0030227 A1 | 2/2012 | Mital et al. |
| 2012/0173678 A1* | 7/2012 | Doyle ..................... H04L 67/51 709/220 |
| 2012/0256725 A1 | 10/2012 | Hayashi |
| 2012/0303476 A1 | 11/2012 | Krzyzanowski et al. |
| 2013/0086674 A1 | 4/2013 | Horvitz et al. |
| 2013/0124855 A1* | 5/2013 | Varadarajan ........... G06Q 20/40 726/4 |
| 2013/0179954 A1 | 7/2013 | Bidare |
| 2013/0211900 A1 | 8/2013 | Dessert |
| 2013/0227651 A1 | 8/2013 | Schultz et al. |
| 2013/0290347 A1 | 10/2013 | Saib |
| 2013/0291099 A1* | 10/2013 | Donfried ............ G06Q 30/0637 726/22 |
| 2013/0297698 A1 | 11/2013 | Odero et al. |
| 2013/0298208 A1 | 11/2013 | Ayed |
| 2014/0077929 A1 | 3/2014 | Dumas et al. |
| 2014/0189808 A1 | 7/2014 | Mahaffey et al. |
| 2014/0279208 A1 | 9/2014 | Nickitas et al. |
| 2014/0379618 A1 | 12/2014 | Chen et al. |
| 2015/0033305 A1 | 1/2015 | Shear et al. |
| 2015/0046711 A1 | 2/2015 | Slaby et al. |
| 2015/0142891 A1 | 5/2015 | Haque et al. |
| 2015/0207701 A1* | 7/2015 | Faaborg .................. H04L 67/52 709/224 |
| 2015/0242473 A1 | 8/2015 | Brugard et al. |
| 2016/0063235 A1* | 3/2016 | Tussy .................... H04W 12/06 726/6 |
| 2016/0226865 A1 | 8/2016 | Chen et al. |
| 2016/0267265 A1 | 9/2016 | Waltermann et al. |
| 2016/0344828 A1 | 11/2016 | Hausler et al. |
| 2016/0357823 A1 | 12/2016 | Chimalamarri et al. |
| 2016/0358394 A1* | 12/2016 | Konicek .................. H04W 4/14 |
| 2017/0116342 A1 | 4/2017 | Keane et al. |
| 2018/0300324 A1 | 10/2018 | Ziraknejad et al. |
| 2019/0026450 A1* | 1/2019 | Egner ..................... G06F 21/44 |
| 2019/0121350 A1* | 4/2019 | Cella .................. G05B 23/0294 |
| 2019/0171187 A1* | 6/2019 | Cella .................. G05B 19/4183 |
| 2020/0051349 A1* | 2/2020 | Campbell ............. H04L 63/107 |
| 2020/0066071 A1* | 2/2020 | Budman ................ H04L 63/08 |
| 2020/0329046 A1* | 10/2020 | Douglas ................ G06Q 40/02 |

OTHER PUBLICATIONS

U.S. Non-Final Office Action in U.S. Appl. No. 15/838,792, dated Nov. 18, 2020, 59 pages.
Wikipedia.com "Wireless ad hoc network", Wikipedia, dated Mar. 25, 2017, 8 pages, retrieved on Jun. 18, 2018 retrieved from URL:https://en.wikipedia.org/w/index.php?title=Wireless_ad_hoc_network&oldid±772049889, 8 pages.
Ross et al., "Exploiting the "Doddington Zoo" Effect in Biometric Fusion", Proc. of 3rd IEEE International Conference on Biometrics: Theory, Applications and Systems (BTAS), (Washington DC, USA), Sep. 2009, 7 pages.
Ross et al., "Information fusion in biometrics", Pattern Recognition Letters 24 (2003) 2115-2125.
Marasco et al., "Combining Match Scores with Liveness Values in a Fingerprint Verification System", Proc. of 5th IEEE International Conference on Biometrics: Theory Applications and Systems (BTAS), Washington, DC, Sep. 2012, 8 pages.
Hamad, H., et al., 'Data encryption using the dynamic location and speed of mobile node', Journal Media and Communication Studies, vol. 2(3) pp. 067-075, Mar. 2010, http://www.academicjournals.org/article/article1382008750_Hammad%20and%20Elkourd%202.pdf.
International Search Report and Written Opinion in International Application No. PCTAJS2018/028011, dated Jul. 10, 2018, 13 pages.
Nandakumar, "Likelihood Ratio-Based Biometric Score Fusion", IEEE Transactions on Pattern Analysis and Machine Intelligence, vol. 30, No. 2, Feb. 2008, pp. 342-347.
Latha et al., "Efficient approach to Normalization of Multimodal Biometric Scores", International Journal of Computer Applications (0975-8887), vol. 32—No. 10, Oct. 2011, pp. 57-64.
PCT International Preliminary Report on Patentability in International Appln. No. PCT/US2018/028011, dated Oct. 31, 2019, 7 pages.
U.S. Final Office Action in U.S. Appl. No. 14/600,274, dated Dec. 29, 2017, 25 pages.
U.S. Final Office Action in U.S. Appl. No. 14/600,264 dated Nov. 15, 2017, 36 pages.
U.S. Final Office Action in U.S. Appl. No. 14/600,264 dated Nov. 2, 2016, 29 pages.
U.S. Non-Final Office Action in U.S. Appl. No. 14/600,264 dated Jul. 11, 2016, 18 pages.
U.S. Non-Final Office Action in U.S. Appl. No. 14/600,264, dated Apr. 21, 2017, 32 pages.
U.S. Non-Final Office Action in U.S. Appl. No. 14/600,274, dated Aug. 11, 2017, 16 pages.
U.S. Notice of Allowance in U.S. Appl. No. 14/600,274, dated Aug. 13, 2019, 13 pages.
U.S. Notice of Allowance in U.S. Appl. No. 14/600,274, dated May 22, 2018, 9 pages.

* cited by examiner

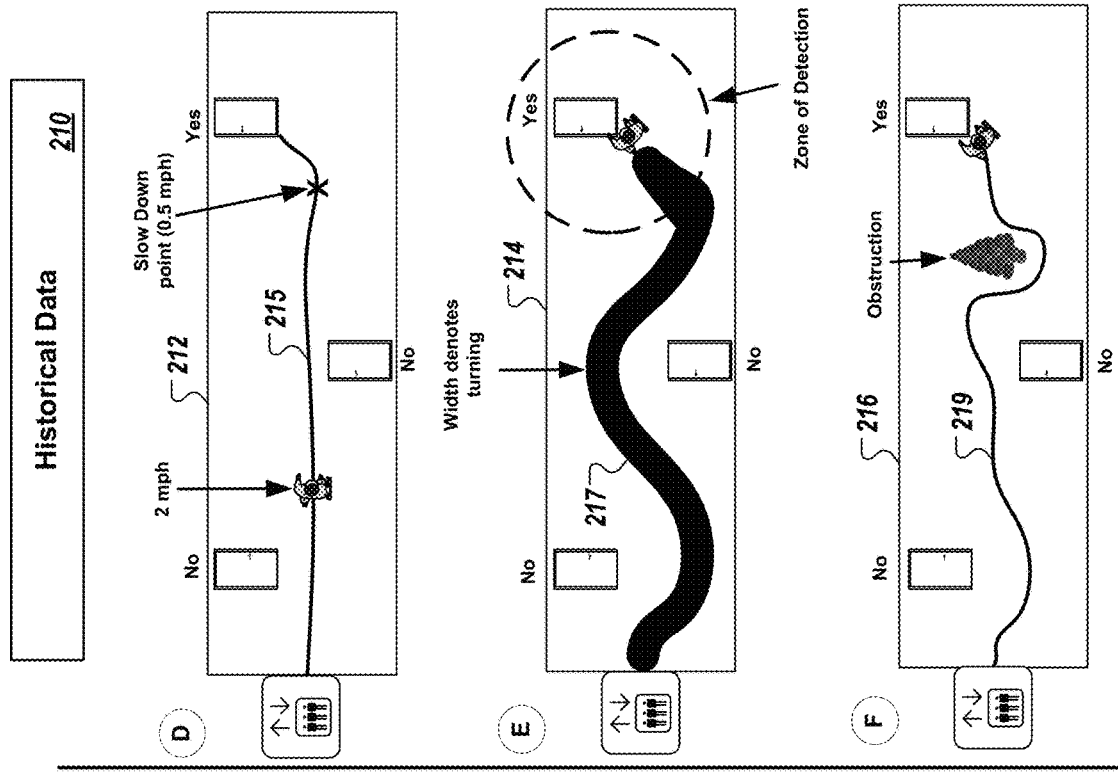
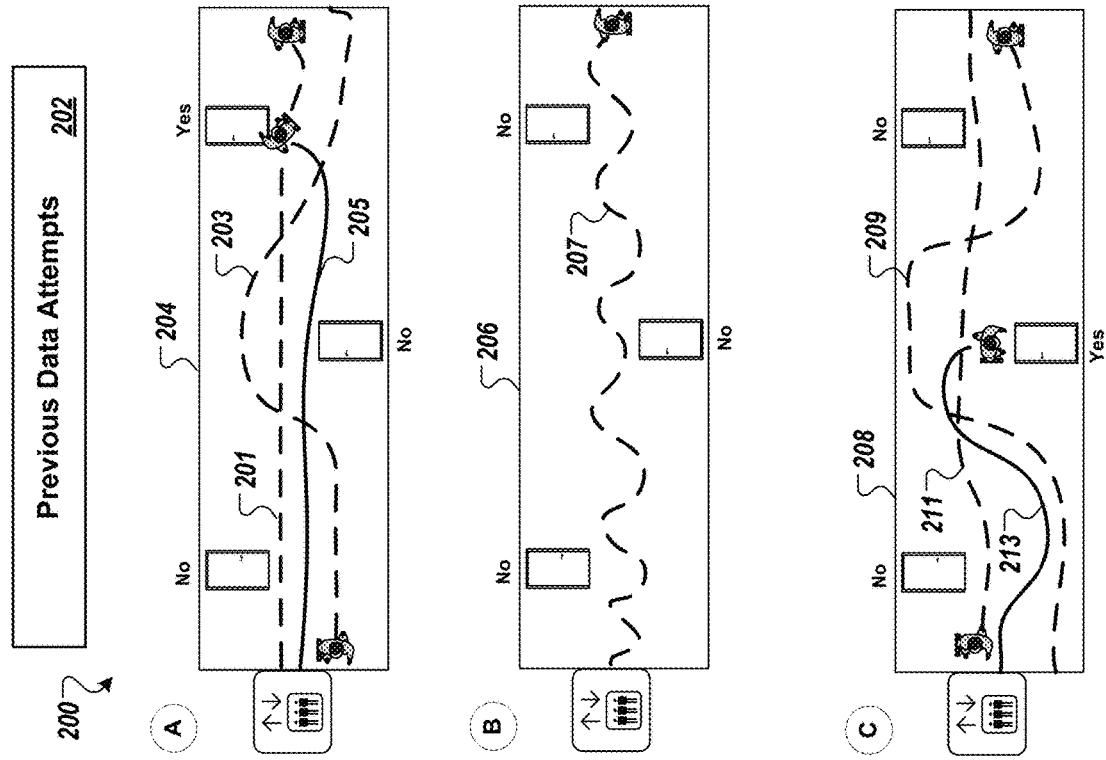
FIG. 2

400

```
┌─────────────────────────────────────────────────────────────────────┐
│ Receive movement data indicating movement of a mobile device        │
│ associated with a user while the mobile device approaches a         │
│ secured resource                                                    │
│                                                                 402 │
└─────────────────────────────────────────────────────────────────────┘
                                    │
                                    ▼
┌─────────────────────────────────────────────────────────────────────┐
│ Determine that a credential of the user authorizes access to the    │
│ secured resource                                                    │
│                                                                 404 │
└─────────────────────────────────────────────────────────────────────┘
                                    │
                                    ▼
┌─────────────────────────────────────────────────────────────────────┐
│ Based on the movement data, classify the movement of the mobile     │
│ device as corresponding to an attempt to access the secured         │
│ resource                                                            │
│                                                                 406 │
└─────────────────────────────────────────────────────────────────────┘
                                    │
                                    ▼
┌─────────────────────────────────────────────────────────────────────┐
│ Determine that the mobile device is in proximity to the secured     │
│ resource                                                            │
│                                                                 408 │
└─────────────────────────────────────────────────────────────────────┘
                                    │
                                    ▼
┌─────────────────────────────────────────────────────────────────────┐
│ Before the user interacts with the secured resource, cause the      │
│ secured resource to be unlocked or opened in response to (i)        │
│ determining that the credential of the user authorizes access to    │
│ the secured resource, (ii) classifying the movement of the mobile   │
│ device as corresponding to an attempt to access the secured         │
│ resource, and (iii) determining that the mobile device is in        │
│ proximity to the secured resource                               410 │
└─────────────────────────────────────────────────────────────────────┘
```

FIG. 4

PREDICTIVELY PROVIDING ACCESS TO RESOURCES

BACKGROUND

This specification relates generally to predictively providing access to resources.

SUMMARY

In some implementations, an access control system evaluates data about a user's movements to predictively unlock or otherwise provide access to a physical resource that is secured (e.g., locked or otherwise has access restricted). The system can evaluate the movement patterns and paths traveled by a user and predict whether the user will attempt to access a physical resource nearby. The resource may be a door, a locker, an electronic device, a car, or a light switch, to name a few examples. When the user is in proximity to a particular resource, the system may automatically authenticate the user and verify that the user is authorized to access to the resource. The system can then predict whether the movement data for the user represents a current or upcoming attempt by the user to access the resource. When the system classifies the user's movement as indicative of an access attempt for the resource, the system automatically unlocks or otherwise provides access to the resource. In this way, the system can predictively provide access to a secured resource before the user reaches the resource or requests access to the resource. The system maintains security by keeping out unauthorized users, while facilitating access for authorized users by predictively granting access to specific resources by specific authorized users based on current and prior movements of the users.

The access control system predicts whether a user will attempt to access a resource by analyzing current path and movement data for the user as well as prior path and movement data for the same user. For example, to classify the user's current movement with respect to a door, the system can evaluate paths previously traveled by the user when the user approached and opened the same door and/or other doors. The system can then compare the current path of the user with the patterns known to represent prior door approaches by the user, and detect a high access attempt likelihood when at least a minimum level of similarity is present. The system can evaluate various criteria, such as motion characteristics of the user when in proximity to the resource, characteristics of previous instances when the user accessed the resource, characteristics of instances when the user was near resources and did not access the resources, and characteristics describing user's credentials for accessing the resource.

To maintain security, it is also desirable to avoid unlocking or opening secured resources when an unauthorized user approaches. At the same time, it is also desirable to make access to secured resources by authorized users as seamless and unintrusive as possible. In many cases, proximity to a physical resource alone does not indicate that a user intends to or is attempting to access a resource. For example, a user walking down a hall may pass close by several different doors that the user has no intention of opening. Even slowing down or stopping near a door does not necessarily indicate an intent to open a door, since the user pause for many different reasons, e.g., to talk to someone in the hall, to make a phone call, to check email, to look out a window, etc. As a result, providing access based on proximity or presence alone generally does not provide sufficient security, even if the identity of the user is known, because other unauthorized users nearby may take advantage of unintended grants of access. Among other techniques, the access control system can evaluate various factors beyond a user's identity and presence near a secured resource, including the pattern of motion of a mobile device and the path the mobile device has traveled up to the point of entering proximity with the secured resource. With this information, the system can determine whether the current path and movement of the mobile device of a user fits the pattern of path and movement for previous legitimate accesses by the same user. Then system can grant automatic access only when the data matches the pattern of prior accesses.

The access control systems discussed in this document can maintain security while increasing ease of access by authorized users. For example, to unlock a door, a user carrying his mobile device may simply walk up to the door. As the user approaches, the access control system can unlock the door automatically, before the user even touches the door handle and without the door locking mechanism detecting any key, security token, or the mobile device. To do this, the access control system can verify the user's identity, credentials, and authorization to open the door using wireless communications with the user's mobile device. The access control system can also predict the specific user's likelihood of attempting to access the specific door based on a series of communications with the user's mobile device as the user approaches.

In some implementations, the lock does not need to perform any communication with the user's mobile device or any key or security token (e.g., no key card reading and no near-field communication with the locking mechanism is needed). The user does not need to specify an intent to open the door in advance (e.g., with a request or control on an application), and does not need to provide any voice input. Indeed, the locking mechanism need not detect any user or device presence and need not receive or evaluate any code, password, or any other input. Instead, the access control system can use a local or remote server system to collect and analyze the movement data for a user, and to then instruct a specific secured resource to be opened when the system determines that the movement data shows a sufficiently high likelihood that the user will attempt access to the resource. The locking mechanism of the resource can be in communication with the access control system, and the locking mechanism can simply respond to an instruction of the access control to unlock once the access control system determined that the appropriate conditions for automatic access are satisfied.

One of the advantages of the system is that automatically access can be provided for a variety of secured resources without requiring proximity sensors in or near each of the resources. The system can also support predictive automatic access without requiring resources to have the capability to receive or verify any codes, passwords, keys, biometrics (e.g., face scans, eye scans, fingerprints, voice prints, etc.), or any other input from a user. Although a resource may include the capability to read a key card or verify a biometric parameter, the access control systems discussed herein can facilitate rapid automatic access so that, when approaching a secured resource, a user does not need to provide these biometric identifiers or any other code or identifying information before automatically receiving access.

In some implementations, if the access control system determines that the user intends to access the resource, the access control system evaluates the user's credentials and provides the user access to the resource if the access control system authenticates the user's credentials. For example, when a user is in close proximity to a door, the access control system automatically predicts whether the user will attempt to open the door based on data associated with the user. The data can include information received from a client device corresponding to the user. This information can include a triangulation position of the client device using GPS coordinates, a direction of movement of the user, a velocity of the user, a path taken by the user to approach the resource, and beacon proximity information. Other external information may include a time of day, resource specific data, and client device information. The access control system analyzes these characteristics to predict whether the user will open the resource or walk past the resource. If the access control system predicts that the user will open the resource, the access control system determines whether the user has the credentials to access this resource. If the user does not have the credentials or the correct credentials to access the resource, then the access control system does not unlock the resource. Otherwise, the access control system grants the user access to the resource by unlocking the resource without user interaction.

In some implementations, the access control system may utilize a user's historical data when predicting whether the user will access a resource. For example, the access control system may retrieve the user's historical data, e.g., a previous pattern of motion when a user previously attempted to access a resource. The access control system can compare the previous pattern of motion to a current pattern of motion of the user to determine if a match or a substantially similar match exists.

In some implementations, the access control system may train one or more machine learning models (e.g., artificial neural networks) to predict a likelihood of whether the user will attempt to access the resource. The model can be trained on previous attempts of the user accessing the resource, previous attempts of the user not accessing the resource, motion data of the user for accessing and not accessing the resource, client device specific information of a user, and resource specific information. During production, the access control system can provide client device information and resource specific information to the model. The model will produce an output indicating whether the user will attempt to access the resource.

In some implementations, the user's client device provides information to the access control system in response to the client device detecting beacon identifiers located in proximity to the resources. For instance, as a user approaches a resource, the client device detects a beacon identifier sent by the beacon device. Once the client device detects the beacon identifier, the client device provides client-device-specific information, such as the beacon identifier for the detected beacon and signal strength of the detection, to the access control system. The client device may provide information about location beacons detected periodically as the client device approaches or departs from the secured resource. The server may first verify whether the user is likely to access the particular resource in nearest proximity to the beacon device. If the access server predicts that the user will access the resource (e.g., based on comparing the client-specific information received from the client device with previous user data), the access server then determines whether the user is authenticated and has the credentials to access the resource. In addition, the access control system may calculate a time when to open (and close) the resource based on a movement of the user. The access control system provides an instruction to the resource's control system and the resource is opened (or closed after the user moves away). The access control system stores the client device specific data for future use.

In some implementations, the client device (instead of the access control system) may produce an indication of whether the user is likely to access a resource. The client device may monitor the user's behavior, produce the indication of whether the user will attempt to access the resource, and transmit an instruction to unlock and open the resource. The client device can store historical data corresponding to data for resources that the user is authorized to access. In other implementations, the client device may store only data for doors that the user actually uses. The data can be dynamically cached on the client device, based on where the user is currently located. In some implementations, the client device may authenticate a user's access to a resource with the use of biometrics, pulse patterns, an electrocardiogram (ECG), or utilizing a smart watch connected to a user's client device.

In a general aspect, a method is performed by one or more computers. The method includes: receiving, by the one or more computing devices, movement data indicating movement of a mobile device associated with a user while the mobile device approaches a secured resource; determining, by the one or more computing devices, that a credential of the user authorizes access to the secured resource; based on the movement data, classifying, by the one or more computing devices, the movement of the mobile device as corresponding to an attempt to access the secured resource; determining, by the one or more computing devices, that the mobile device is in proximity to the secured resource; and before the user interacts with the secured resource, causing the secured resource to be unlocked or opened in response to (i) determining that the credential of the user authorizes access to the secured resource, (ii) classifying the movement of the mobile device as corresponding to an attempt to access the secured resource, and (iii) determining that the mobile device is in proximity to the secured resource.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the method includes determining that the user is currently authenticated using the mobile device; wherein causing the secured resource to be unlocked or opened is based on determining that the user is currently authenticated using the mobile device.

In some implementations, the method includes wherein the one or more computing devices are a server system; wherein causing the secured resource to be unlocked or opened comprises sending, by a server system and over a computer network, access data that causes the secured resource to unlock or open itself in response to receiving the access data.

In some implementations, the method includes wherein the secured resource is a door, locker, machine, electronic device, or vehicle.

In some implementations, the method includes wherein the movement data comprises data indicating a path that the mobile device travelled to reach proximity with the secured resource.

In some implementations, the method includes wherein the movement data comprises data identifying wireless beacons detected by the mobile device at different point in time while the mobile device approaches a secured resource.

In some implementations, the method includes wherein the movement data indicates times and signal strengths with which messages from the beacons were received by the mobile device.

In some implementations, the method includes wherein the movement data indicates sensor data from an accelerometer, inertial measurement unit, or compass of the mobile device.

In some implementations, the method includes wherein classifying the movement of the mobile device includes: generating, by the one or more computing devices, an access likelihood score based on the movement data, wherein the likelihood score indicates a predicted likelihood that the user will attempt to access the secured resource; and determining that the access likelihood score satisfies a threshold.

In some implementations, the method includes wherein generating the access likelihood score includes: providing, as input to a trained machine learning model, feature values generated from the movement data, wherein the trained machine learning model is configured to classify whether movement patterns represent an attempt to access a resource; and receiving the access likelihood score as an output that the trained machine learning model provides in response to receiving the feature values as input.

In some implementations, the method includes wherein the trained machine learning model is a trained artificial neural network.

In some implementations, the method includes wherein the trained machine learning model has been trained based on a plurality of training examples indicating movement patterns that resulted in a user accessing a secured resource and a plurality of training examples indicating movement patterns that did not result in a user accessing a secured resource.

In some implementations, the method includes wherein determining that the mobile device is in proximity to the secured resource comprises determining that mobile device is within a predetermined distance of the secured resource based on a signal strength of a communication between the mobile device and a location beacon device that is located at a predetermined location with respect to the secured resource.

In some implementations, the method includes wherein classifying the movement of the mobile device is based on a similarity between (i) characteristics of the current approach to the secured resource by the user and characteristics of (ii) characteristics of one or more previous approaches by the user that resulted in the user accessing the secured resource or another secured resource.

In some implementations, the method includes wherein classifying the movement of the mobile device includes: comparing the movement data with movement patterns for multiple users leading to access of any of multiple resources of a same type as the secured resource; comparing the movement data with movement patterns for multiple users leading to access to the secured resource; comparing the movement data with user-specific movement patterns leading to previous accesses by the user to multiple resources of the same type as the secured resource; or comparing the movement data with user-specific movement patterns leading to previous accesses by the user to the secured resource.

In some implementations, the method includes wherein the characteristics of the current approach to the secured resource by the user comprise at least one of: a current time of day, a current speed of movement of the mobile device, a current acceleration of the mobile device, a current direction of movement of the mobile device, a current orientation of the mobile device, a path travelled by the mobile device as the mobile device approaches the secured resource, a sequence of location beacons detected by the mobile device as the mobile device approaches the secured resource, or a signal strength of communications with the location beacons; wherein the characteristics of one or more previous approaches comprise at least one of: a time of day of a previous access to the secured resource by the user, a speed of movement of the mobile device during an approach leading to access to the secured resource by the user, an acceleration of the mobile device during an approach leading to access to the secured resource by the user, a direction of movement of the mobile device during an approach leading to access to the secured resource by the user, an orientation of the mobile device during an approach leading to access to the secured resource by the user, a path travelled by the mobile device as the mobile device during an approach leading to access to the secured resource by the user, a sequence of location beacons detected by the mobile device during an approach leading to access to the secured resource by the user, or a signal strength of communications with the location beacons during an approach leading to access to the secured resource by the user.

In some implementations, the method includes wherein the mobile device is a phone or a watch.

In some implementations, the method includes determining, based on the movement data, (i) a path that the mobile device has travelled while the mobile device approaches the secured resource, the path being determined based on identifiers for location beacons that the mobile device received beacon messages from while approaching the secured resource and signal strengths at which the beacon messages were received, (ii) speed and acceleration of the mobile device at multiple positions along the path, (iii) a current location of the mobile device, and (iv) a current speed and direction of the mobile device; wherein classifying the movement of the mobile device includes: comparing (i) the path and speed and acceleration of the mobile device along the path with (ii) a path of a previous approach of the user to the secured resource that resulted in the user accessing the secured resource and the speed and acceleration along the path of the previous approach; comparing a time of the approach to the secured resource with one or more times that the user previously accessed the resource; wherein the method includes determining, based on the current location, speed, and direction of the mobile device, a time to cause the secured resource to be unlocked or opened, wherein the secured resource is caused to be opened at the determined time by sending an instruction to the secured resource that specifies the determined time or sending an instruction to the secured resource at the determined time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a block diagram that illustrates an example of data used to predictively provide access to a resource.

FIG. 4 is a flowchart that illustrates an example of a process to predictively provide access to a resource.

Like reference numbers and designations in the various drawings indicate like elements.

DETAILED DESCRIPTION

Figure 1:
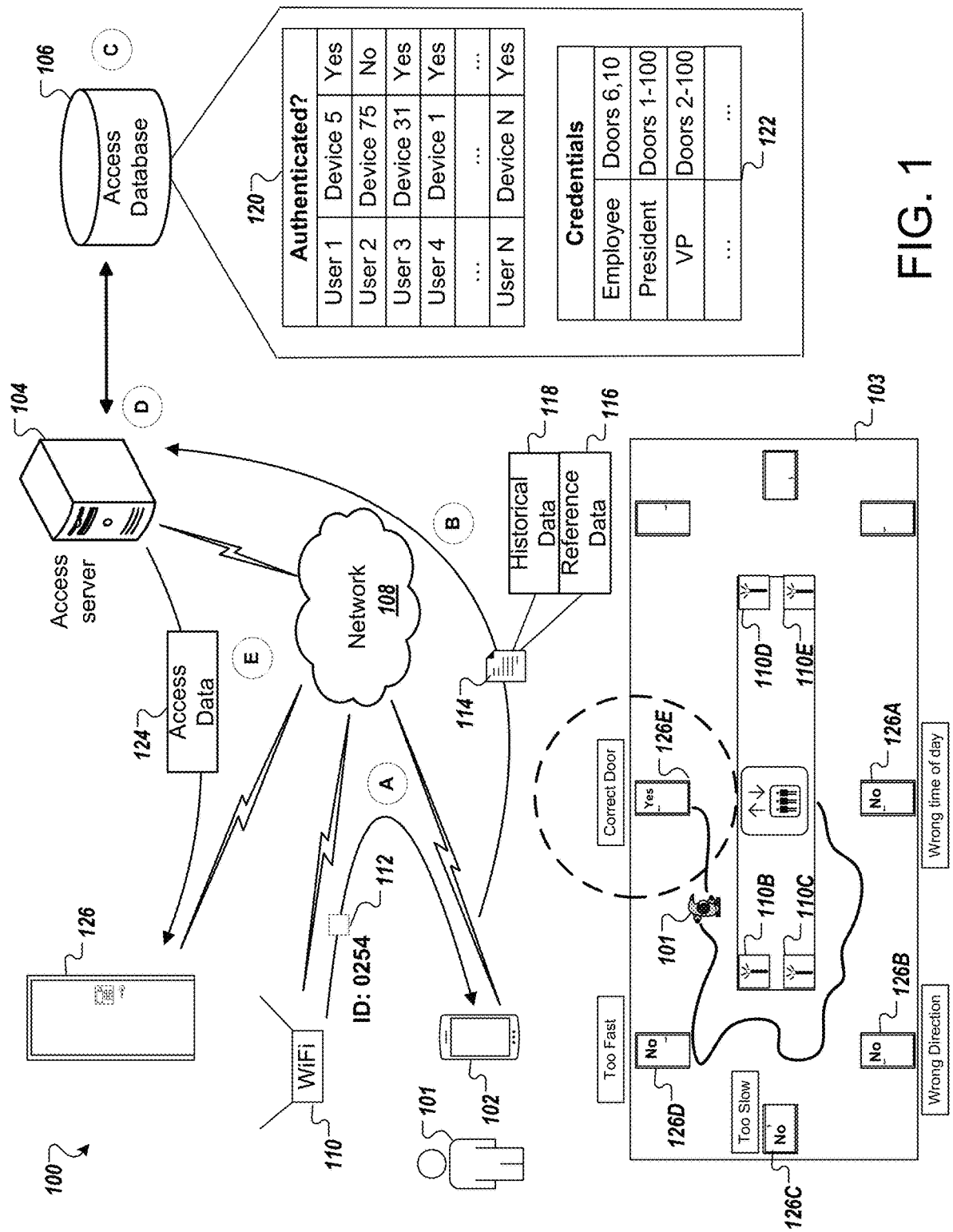
FIG. 1 is a block diagram that illustrates an example of a system for predictively providing access to a resource.

FIG. 1 is a block diagram that illustrates an example of a system 100 for providing contextually relevant document recommendations. The system 100 includes a client device 102, an access server 104, an access database 106, a wireless beacon 110, and a network 108. The access server 104 communicates with various data repositories, which can be stored on one or more data storage devices. These data repositories include access database 106 and one or more data repositories for the access server 104. FIG. 1 illustrates various operations in stages (A) to (H) which can be performed in the sequence indicated or in another sequence.

As further discussed below, the system 100 identifies a user entering an area upon recognizing the user's client device detects beacon identifiers located in proximity to one or more resources. For instance, as user 101 enters an area in system 100, user 101's client device 102 detects the beacon identifiers in proximity to the one or more resources. In response to the client device 102 detecting the beacon identifiers, such as a beacon message 112 that includes a beacon identifier, the client device 102 provides client-device-specific information, including the beacon identifiers currently or recently (e.g., within a predetermined time period like 1 second or 5 seconds) detected by the client device 102, to the system 100. The system 100 utilizes the client device 102 specific information and beacon identifier to determine whether the user is authenticated to access a particular resource, and in response, determining whether to provide access data to the resource.

In some implementations, the system 100 provides access data that causes a secured resource to become unlocked, opened, or otherwise accessible. The system 100 can provide this access data while the user is approaching the resource, so that the resource becomes accessible as the user enters proximity of the resource. The secured resource may be, for example, a locked door, a locked locker, or a compartment that becomes automatically unlocked or opened as the authorized user approaches. The access data can include an instruction to unlock the resource, an instruction to open the resource, a length of time for the resource to remain open, a distance or extent to open the resource, and an indication as to when to lock or close the resource. The system 100 determines whether to grant access to the resource based on factors such as the user's proximity to the resource, the classification whether the user will attempt to access the resource, the user's credentials (e.g., whether the user is authorized to access the resource), the user's authentication state (e.g., whether the user is currently authenticated with the system), data about previous attempts to access to the resource by the user, access policies for the resource or the user's credential (e.g., limiting a time, place, or other circumstances when access is allowed), and so on. In addition, the system 100 can predict whether the user will attempt to access the resource (e.g., as opposed to stopping nearby for another purpose or moving past the resource) based on factors such as a current and recent movement of the client device (e.g., movement for a time period up to the current time), the current trajectory and recent path of the client device, beacon messages recently sent by or detected by the client device, access history of the user, movement data and path data for accessing the resource and/or other resources, and so on.

Referring still to FIG. 1, in the system 100, the client device 102 can be, for example, a desktop computer, a laptop computer, a tablet computer, a wearable computer, a cellular phone, a smart phone, a music player, an e-book reader, a navigation system, or any other appropriate computing device. The access server 104 can represent a single computer or multiple computers, which may be distributed across multiple geographic areas. The network 108 can be wired or wireless or a combination of both, and can include the Internet.

FIG. 1 shows an example in which system 100 determines whether to provide user 101 access to resource 126 based on various characteristics of the user 101 and the client device 102 of the user 101. The client device 102 detects the presence of nearby devices, e.g., beacon device 110, through wireless communications, e.g., over Bluetooth or another short-range wireless communication link. The client device 102 provides the context information of the client device 102 and beacon information (such as beacon identifiers received in wireless messages from the beacon device 110) to the access server 104, which the access server 104 uses to collect further information about the context of the user 101 and the corresponding client device 102. The access server 104 identifies whether the user 101 is authenticated to access the resource 126 and retrieves the user 101's credentials. In response to determining that user 101 is authenticated to access the resource 126, the access server 104 determines whether a user 101 is likely to access the resource 126. This process can occur in the background, automatically, and without any distraction to the user 101.

Once the access server 104 determines that the user 101 is likely to access the resource 126 near the beacon device 110, the access server 104 provides data to the resource 126 indicating that the user 101 is authenticated to access the resource 126. In other implementations, the access server 104 determines that the user is not authenticated to access the resource 126 and provides data to the client device 102 indicating that the user 101 is not authenticated to access the resource 126. The data indicating the user 101 is not allowed access can include a message or an alert that displays on the client device 102. In other implementations, the access server 104 does not provide the indication to the client device 102 and stores the data indicating that the user 101 is not authenticated to access the resource 126 with a timestamp in the access database 106.

During stage (A), the user 101 enters an area (e.g., a hallway, a room, a building, etc.) while carrying a client device 102 (e.g., a wearable device, a phone in the users' pocket, etc.). The client device 102 receives wireless messages from one or more devices found in the room. For example, the client device 102 may receive wireless messages over a direct, short-range radio frequency communication channel from beacon device 110. The beacon device 110 can transmit the wireless messages using Bluetooth, Bluetooth Low Energy (BLE), a protocol according to IEEE 802.15, or using another wireless protocol. The beacon device 110 can be one of many beacon devices that are distributed around the area. The beacon devices can each have unique identifiers that are provided in their respective beacon messages. The beacon devices can also be located at fixed, predetermined locations, so that detection of a beacon message containing a specific beacon identifier indicates proximity to the particular beacon assigned that specific beacon identifier.

The beacon device 110 may transmit the wireless messages periodically, and the messages can be received by the client device 102 when the client device 102 is within an appropriate level of proximity. Beacon devices are hardware transmitters that broadcast messages indicating their identity within a limited geographical range. The beacon devices can transmit their identity using a low energy Bluetooth signal, or some other low energy communication medium. For example, the beacon device can transmit a universally unique identifier that can be picked up or received by nearby device, e.g., such as a client device.

The beacon devices can periodically transmit a beacon message that is a short message including an identifier for the beacon. The beacon message, which the beacon device often sends repeatedly on short intervals, can announce, advertise, or identify the presence of the beacon device. For instance, examples of beacon devices can include beacons that are located in fixed locations and provide periodic messages to facilitate a micro-location, e.g., determination of a position in a building. Reception of a wireless message from a location beacon device with at least a minimum level of signal strength can indicate that the client device 102 is within a known distance from the location beacon. For example, beacons may be located in different rooms in a building or in different portions of a room, or in another space, to indicate the location of a particular area corresponding to the beacon. In an office setting, computers, projectors, printers, and other devices may include beacons that send wireless messages. Similarly, in a manufacturing environment, some pieces of equipment may each include beacons that periodically transmit beacon messages. A beacon may be attached to any appropriate item, whether the item is movable or in a fixed location, and reception of a beacon message and signal strength at which the beacon message is received can indicate the distance of the receiving device to the beacon.

In some implementations, the client device can receive the beacon identifier and provide the beacon identifier along with client device identification data (e.g., an identifier for the client device) to a server, such as access server 104. The access server 104 can receive the beacon identifier from the client device 102 and perform multiple functions in response. For example, the access server 104 can determine an identity of the sender, e.g., client device, based on the transmitted identification data. The identity can correspond to an identification number associated with the client device, such as, a telephone number or a device ID number, as a few examples. Additionally, the server can approximate a location of the client device based on the received beacon identifier. For example, the server associates a beacon device with the received beacon identifier, which indicates a location of the beacon device. Additionally, the server can assess a signal strength of the received beacon identifier that directly indicates a distance between the client device and the beacon device. For example, the higher the signal strength of the received beacon identifier, the closer the client device is located to the beacon device. Likewise, the lower the signal strength of the received beacon identifier, the farther the client device is located from the beacon device.

As illustrated in FIG. 1, the client device 102 receives a wireless message 112 from a beacon device 110 located in the system 100. The messages of the beacon device 110 can include an identifier for identifying the beacon device 110. For example, the wireless message 112 may include a beacon identifier of the beacon device 110, such as ID: 0254, as shown in FIG. 1. The client device 102 can receive the wireless message 112 over the network 108.

During stage (B), the client device 102 sends data 114 indicating its current context to the access server 104 over the network 108 in response to receiving the wireless message from the beacon device. The data 114 indicating the current context of client device 102 includes reference data 116, historical data 118, including the wireless message from the beacon device. The reference data 116 includes an identifier of the client device 102, user login data of user 101, one or more passwords for the user to login to the client device 102, and data indicating what resources the user 101 is authenticated to access. For example, the reference data includes an identifier 001 for the client device 102, username: john as the login data of user 101, a password of 12345 for the user john to login to the client device 102, and data indicating that the user John is authenticated to access doors 1-30. In some implementations, the reference data includes beacon data. The beacon data includes a sequence of location beacons detected by the client device as the client device approaches the secured resource and a signal strength of communication for each location beacon in the sequence. From the sequence of detected beacons, as well as timestamps and signal strengths for detection of the beacon messages, the server system can infer the path that the client device 102 traveled. For example, using map data indicating predetermined, known locations of the beacons, the server system can triangulate or otherwise determine the positions of the client device 102 at various times, allowing a path of the client device 102 over time to be determined.

In some implementations, the historical data includes current and previous context data of the client device 102 along with previous attempts of client device 102 accessing one or more resources. The current and previous context data of the client device 102 includes data provided by an accelerometer and GPS device of the client device 102. For example, the accelerometer provides information regarding the velocity and acceleration of the client device 102 over a predetermined period of time and a current orientation of the client device 102. The GPS device provides information regarding locational information of the client device 102 over a similar predetermined period of time. In some implementations, the client device 102 correlates the GPS data and the accelerometer data and provides the correlated data to the access server 104 in the historical data 118. The correlated data provides an indication to the access server 104 that describes how the client device 102 moves over the past-predetermined period of time. For example, the correlated data can indicate to the access server 104 that over the past 30 seconds, the client device 104 has increased his or her speed along a path from an elevator to a particular door, and moved past that door. In another example, the correlated data can indicate to the access server 104 that over the past 1 minute, the client device 102 has slowed his or her speed down along a particular path from an elevator to another door, and entered the door. Additionally, the historical data includes data of the client device 102 that indicates a current location of the client device 102. The current location of the client device 102 can include location position coordinates.

In some implementations, the client device 102 transmits the data 114 that represents the historical data 118 and the reference data 116. For example, the data 114 can be a link to a location in memory in the access database 106 that has the historical data 118 and the reference data 116 already stored. In another example, the data 114 can be a link to a URL that includes the historical data 118 and the reference data 116. In another example, the data 114 can be the historical data 118 and the reference data 116 itself.

During stage (C), the access server 104 receives the data 114 that represents the historical data 118 and the reference data 116. The access server 104 determines the client device identification information from the reference data 116 in response to receiving the data 114. For example, the access server 104 determines from the reference data 116 the client device 102 that transmitted the data 114, the user 101 that corresponds to the client device 102, credentials of the user 101 that corresponds to the client device 102, and resources that the client device 102 believes the user 101 is able to access. The access server 104 uses the client device identification information and data from the access database 106 to predict whether the user 101 is likely to access a particular resource.

In some implementations, the access database 106 includes one or more databases for authentication and credential information for particular users. The access database 106 includes an authentication table 120 and a credentials table 122. The authentication table 120 includes one or more fields indexed by a user identification. The first column in the authentication table 120 defines the user identification for each particular user. For example, the user identification can include an identification of the user 101, a name of the user 101 corresponding to the client device 102, or a coded representation of the user name corresponding to the client device 102.

The second column in the authentication table 120 represents the client device corresponding to the particular user 101. For example, the second column can include an identification of the client device, such as, a personal identification of the client device, a phone number corresponding to the client device, a URL corresponding to the client device, or a name of the client device. In some implementations, a user can have multiple personal devices. For example, user 1 can have devices 5, 6, and 7 that are stored in the authentication table 120. The devices 5, 6, 7 can each be stored in the second column in the authentication table 120 in the row corresponding to the user 1 from the first column.

The third column in the authentication table 120 indicates whether the user is authenticated with the system 100. A user can be known in the system 100 but not be authenticated with the system 100. For example, as illustrated in FIG. 1, users 1, 3, and 4 are authenticated with the access server 104. User 2 is known in the system 100 but user 2 has not authenticated with the system 100. In some implementations, authenticating with the system indicates that a client device has notified the access server 104 of its presence and registered with the access server 104 by supplying credentials that the access server 104 recognizes. For example, users 1, 3, and 4 have all notified access server 104 of their presence and supplied credentials that the access server 104 recognizes, e.g., a recognized username and password. Alternatively, user 2 has notified access server 104 of its presence but its supplied credentials do not match the stored credentials access server 104 has saved. The user 2 may have incorrectly entered his or her credentials in client device 75, thus indicating, the user operating client device 75 is not user 2 or that user 2 has forgotten his or her login credentials. In some implementations, a new user can identify itself in the system 100 to the access server 104 and the access server 104 may not recognize the credentials. For example, the access server 104 may receive data 114 from a new device 99 corresponding to a user 3. If the access server 104 does not recognize the credentials of device 99 from user 3, the access server 104 can store a new entry in the device table 120 for device 99 of user 3 and request credentials from the user 3. In response, user 3 can provide the credentials to the access server 104 and the access server 104 can store user 3's credentials and device information in the authentication table 120 and the credentials table 122.

In some implementations, the credentials table 122 includes two columns that the access server 104 can access. In particular, the credentials table 122 includes a first column that describes the user and a second column that identifies which resources the user is authenticated to access. For example, user 1 can be an employee that is allowed access to doors 6 and 10. User 3 can be a president that has access to doors 1-100. The higher ranking an individual is in a professional environment, the more resources the individual can access. For example, the president of a company has access to more doors in system 100, such as a facility, than an employee of the same company.

In some implementations, the access server 104 can include a trained neural network model to produce a likelihood of whether a user is likely to access a particular resource. The access server 104 retrieves data from the access database 106 to train a neural network model. For example, the data retrieved from the access database 106 to train the neural network model includes user and client device data, data corresponding to a particular resource, attempts by the user to previously access the particular resource, and historical data of the user and client device. As will be further described below, the access server 104 provides each of these data pieces as input into the neural network model for training. The trained neural network model will produce an output likelihood that indicates whether a user is likely to access the particular resource. For example, the trained neural network model can produce a statistical likelihood, such as 95%, that the user 101 is likely to access door 126. The access server 104 can then compare the statistical likelihood to one or more thresholds, to determine whether to lock, unlock, or open the door 126 for the user.

There can be many reasons why the access server 104 determines that the user 101 is not likely to access a resource. For example, the trained neural network model can produce a 60% likelihood that the user 101 is likely to access the door 126. The access server 104 can use the likelihood along with other factors to determine whether to unlock the door 126. For example, the access server 104 can determine that the user 101 was moving too fast or too slow towards the door 126 by analyzing the speed of the client device 102 from the historical data 118 and comparing it to user 101's typical speed when attempting to open the door 126. In another example, the access server 104 can determine that the user 101 was moving in the wrong direction, e.g., away from the door 126 rather than towards the door 126. In another example, the access server 104 can determine that the user 101 is not likely to access door 126 because the current time is outside a range of time when the user 101 typically accesses door 126 at 4:00 PM and 10:00 AM.

In response to the trained neural network model producing a likelihood that the user is likely to access a particular resource, the access server 104 determines whether the user has the credentials to access the particular resource. The access server 104 correlates the data 114 provided by the user with data from the authentication table 120 and the credentials table 122. If the access server 104 determines that authentication and the credential data provided in the data 114 matches with the data provided in the authentication table 120 and the table 122, the access server 104 proceeds to providing the user 101 with access to the particular resource. In other implementations, the access server 104 can determine if the data 114 provided by the user correlates with the data from the authentication table 120 and the credentials table 122 before providing data to the trained neural network model. In this instance, the access server 104 can speed up response time by quickly determining if the user is authorized or has the credentials to access the particular resource before even predicting whether the user will access the resource. By checking if the user is authorized and/or has the credentials first, the access server 104 can more efficiently disregard any attempts by users not authorized or having the credentials to access a particular resource.

If the access server 104 determines that the user is unlikely to access the particular resource, the access server 104 does not provide any instructions to the particular resource. In addition, the access server 104 may store data indicative of the results along with the input in access database 106 for future retrieval purposes. For example, if the access server 104 receives similar data from the same client device accessing a similar door at a later point in time, the access server 104 can quickly determine the user does not intend to access the particular resource, without having to use the trained neural network model. Rather, the access server 104 can obtain data from the access database 106 to see if any previous attempt has characteristics that match the current attempt of a user. If a match exists, the access server 104 can use the result of the matched previous attempt in order to speed up the processing of determining a user's likelihood of accessing a particular resource.

In some implementations, the access server 104 can use other methods to predict whether a user will access a particular resource. The access server 104 can use pattern matching of a user's one or more previous attempts to access the particular resource. For instance, the access server 104 can use pattern matching of a user's locational positions, speed, gait, movement, path of approach, and moving direction along with an identification of a user's client device to determine a user's likelihood of accessing the particular resource. Additionally, the access server 104 can use a likelihood determination from the user's one or more previous attempts to determine a user's likelihood of accessing the particular resource.

The access server 104 can determine a path the client device 102 has travelled based on the data in the reference data 116. For example, the access server 104 determines the path by using the beacon data in the reference data 116 that includes the sequence of location beacon devices detected by the client device as the client device approaches the secured resource and a signal strength of communication for each location beacon device in the sequence. The path is determined based on identifiers corresponding to each of the beacon devices that the client device received while approaching the secured resource. The access server 104 can determine the path using the location of each of each of the beacon devices corresponding to the received identifiers by the client device. Additionally, the path is determined based on signal strengths corresponding to the beacon messages that were received by the client device. The access server 104 can also determine the speed and acceleration of the client device at multiple positions along the path, a current location of the client device, and a current speed and direction of the client device. The access server 104 can use each of these components to classify the movement of the client device.

In some implementations, the access server 104 can classify the movement of the client device by comparing the determined path, speed, and acceleration of the client device with a path of a previous approach of the user to the secured resource that resulted in the user accessing the secured resource along with the speed and acceleration along the path of the previous approach. For example, the access server 104 can classify the current movement of the client device similar to the previous approach if the determined path, speed, and acceleration are similar to the determined path, speed, and acceleration of the previous approach. Additionally, the access server 104 compares a time of the approach to the secured resource with one or more times that the user previously accessed the resource.

The access server 104 can also analyze time-specific data to determine whether a user is likely to access a particular resource. The time-specific data, which the access server 104 generates from data 114, can indicate that a user accesses the particular resource at certain time of a day every day of the week. In other implementations, the time-specific data can indicate that a user accesses a particular application on his or her client device immediately before accessing the particular resource at the same time every day of the week. The access server 104 can correlate time-specific data with location data of the client device 102 to determine that the user accesses the particular application on his or her client device at a location within proximity to the particular resource. For example, user 101 can access the client device 102 at 9:00 AM each day while standing next to the door 126 to use a QR CODE against a scanner that unlocks door 126.

Similarly, the access server 104 can analyze resource-specific data to determine whether a user is likely to access a particular resource. The resource-specific data, which the access server 104 generates from data 114, can indicate a location of a particular resource that affects whether a user is likely to access the particular resource. For example, a particular resource, such as a door, may be the only resource located at a corner of a hallway, such that if a user were to move towards that corner of the hallway, the access server 104 can determine that the user is likely to access that door. The access server 104 could use location specific information of a user to determine that when a user passes a particular location threshold, the user is likely to access the door. For example, the access server 104 can determine that when a user passes a particular door in the hallway, the user will most likely access the resource located in the corner of the hallway. In other implementations, the access server 104 can determine that the user is likely to access a particular resource when the client device 102 transmits client specific information to the access server 104 in response to detecting a particular beacon.

During stage (D), the access server 104 can generate access data 124 to provide to the particular resource in response to determining that the user is likely to access a particular resource and determining that the user is authorized and has the correct credentials to access the particular resource. The access server 104 can generate the access data 124 that includes an ID of the particular resource, an indication to unlock the particular resource, an indication to open the particular resource, a length of time for the particular resource to remain open, how far to open the particular resource, and an indication as to when to close the particular resource. For example, the access server 104 can generate access data 124 to provide to a door 126. The access data 124 can include an ID of 0126, an indication of "OPEN" to open the door 126, a length of time of 5 seconds to keep door 126 open, an indication to fully open door 126, and an indication to close the door fully after 5 seconds has elapsed.

In some implementations, the access server 104 can generate another set of access data that indicates to the client device 102 that the particular resource will open. The set of access data can include an identification of the client device, an indication of a particular resource that will open, and an indication of how long the particular resource will remain open. For example, the set of access data can include an ID of 001 or a telephone number of client device 102, an indication that the door 126 will open, and an indication that door 126 will remain fully open for 5 seconds before closing.

The client device 102 can receive the access data from the access server 104 and display to user 101. For example, the client device 102 can utilize a graphical user interface to display these instructions in an application. The user 101 can interact with the application on the client device 102 to request that the resource remain open for longer than five seconds. Additionally, the user 101 can interact with the application on the client device 102 to request a different resource to open other than the resource included in the instructions from the access server 104. The client device 102 can transmit the data indicating a request for a different resource to the access server 104. The access server 104 can receive the client device 102's request and in response, verify the user 101 has been authenticated and has the credentials to access the requested resource. If the access server 104 determines user 101 has been authenticated and has the credentials to access the requested resource, the access server 104 generates instructions for requested resource so user 101 can access the requested resource.

During stage (E), the access server 104 transmits access data 124 to the particular resource. The access server 104 transmits the access data 124 to the particular resource that user 101 is expected to access, such as door 126, over network 108. The door 126 receives the access data 124 and opens for the predetermined time indicated by the time in the access data 124. Once the predetermined time has elapsed, the door 126 fully closes and transmits an indication back to the access server 104 that the door 126 has closed. The access server 104 can transmit access data 124 to other resources than a door, such as a light switch, a vehicle, electronic signs, kitchen ovens, or any other electronic device that requires logical access. Alternatively, the access server 104 can transmit access 124 to other resources than electronic devices, such as software that requires login access like payment websites, social media websites, and blogging websites, to name a few examples.

In some implementations, the access server 104 operates under timing constraints when provide the user 101 with access to the particular resource. For example, the access server 104 can transmit a particular message, e.g., the unlock and open message, to the particular resource such that the particular resource performs the unlock and/or open functions at a particular time before the user reaches the particular resource (e.g., one second or a few seconds before the user is expected to touch the door handle). Additionally, the access server 104 transmits the unlock and open message to the resource such that the user 101 has ample time to access the resource but an unauthorized user near the resource would not have sufficient time to access the resource. The access server 104 can cause the resource to automatically close or lock in response to detecting that the resource was not accessed by the user within a maximum amount of time, or if the user's path changes so that the likelihood of access decreases (e.g., the user changes direction and walks away from the resource.)

The timing constraints for the access server 104 can be based on historical path of the user 101, a current distance the user 101/client device 102 is located from the particular resource, and a speed of the client device 102 approaching or departing from the particular resource. For example, the access server 104 determines from the historical data that it takes user 101 five seconds to enter a particular resource after the resource has been unlocked and opened. In another example, the access server 104 determines from the historical data that it takes user 101 one second to access a particular resource after the resource has opened. Thus, the access server may transmit the notification to the particular resource one second before the user is expected to access the particular resource to precisely time the user's access of the particular resource.

If the access server 104 determines that the client device is a current distance from the particular resource and approaching the particular resource with a particular speed, the access server 104 can estimate the amount of time needed to reach the resource and determine a time to unlock and/or open the particular resource. For example, the access server 104 can determine that the client device is 10 meters from the particular resource and can determine that the client device is moving at a pace of 1 meter per second (m/s) towards the particular resource. Thus, the access server 104 determines that the client device 102 should be in front of the particular resource in 10 seconds. The access server can transmit an unlock and open message at the five second mark to ensure that ample time exists before the client device reaches the particular resource at the ten second mark. Other timing offsets could also be used. Additionally, the access server can transmit a close and/or lock instruction message at the 15-second mark to ensure that the client device has ample time, e.g., 5 seconds, to walk through the particular resource before the particular resource closes and locks itself.

In some implementation, the client device 102 can include an application that executes the operations performed by the access server 104. The application monitors the historical data and the reference data found in the data 114 typically transmitted to the access server 104. In addition, the application monitors the user-specific data, the location-specific data, and the time-specific data of the client device 102 in order to predict whether the user 101 is likely to access a particular resource. In some implementations, the client device 102 communicates with the access database 106 to determine whether the user 101 is authenticated and has the credentials to access the particular resource. In other implementations, the client device 102 tracks whether it has authenticated with system 100 and what resources it has the credentials to access. For example, client device 102 tracks it has authenticated with system 100 once it communicates with a beacon device. Additionally, client device 102 recognizes that it has the credentials to access doors 1-50 in system 100. The client device 102 can similarly display information to the user 101 after access is granted to the particular resource.

When the client device 102 performs the operations of the access server 104, the application on the client device 102 determines whether the user 101 is likely to access the particular resource, and transmits access data to the particular resource in response to determining that the user 101 is likely to access the particular resource. The application on the client device 102 can predict whether the user will access the particular resource using, for example, the locational coordinate position of the client device, direction of current motion, velocity, acceleration, previous direction of motion over a period of time, and movement of client device. For instance, the locational coordinate position can be determined from a GPS device located within the client device 102; the direction of current motion can be determined from a gyroscope, an accelerometer, or a combination of both located within the client device 102; and, the velocity and acceleration can be calculated on the client device 102 using position changes over time.

In order for the client device 102 to predict whether the user 101 is likely to access the resource, the client device 102 stores the historical motion data. In some implementations, the client device 102 caches the historical motion data for resources based on a location of the user. For instance, the client device 102 caches previous historical motion data for a nearby door. The previous historical motion data can include a user's movement while approaching the particular resource, the way a user held the client device 102 while approaching the particular resource, a speed and acceleration with which the user approached the particular resource, and the direction of the path and the path taken by the user while approaching the particular resource. The client device 102 may also only cache historical motion data for particular resources that the user 101 is authorized to access. In other implementations, the client device 102 may cache historical motion data for all resources in a particular environment in the event user 101 gains authorization access to each particular resource.

Once the user 101 accesses the particular resource, the client device 102 and or access server 104 stores data characterizing the user 101's access to the particular resource in the access database 106 for future use. The data characterizing the user 101's access to the particular resource includes an identification of the client device 102, a time with which the user 101 accessed the particular resource, the path user 101 traveled towards the particular resource (e.g., stored in locational coordinates), data indicating the speed and acceleration of the user 101 along the path, and the motion of the client device 102 as the user moved along the path towards the particular resource. The client device 102 and the access server 104 store this data in the access database 106 for facilitating determining whether the user 101 is likely to access the same resource at a later point in time. This allows the client device 102 and the access server 104 to determine in a more efficient manner whether the user 101 is likely to access the same resource without having to use the computational processing of a trained neural network or some other form of comparison. Rather, the client device 102 and the access server 104 may be able to perform a quick look up in the access database 106 to make a determination whether the user 101 is likely to access the particular resource.

The operation of stages (A) to (E) illustrate a single example of providing access to a particular resource for user 101 based on his or her current context. The access server 104 can repeat the operations of stage (A) to (E) as the user 101 moves from one resource to the next resource. Similarly, the access server 104 can perform the operations of stages (A) to (E) to provide access for other users in proximity to resource 126. For example, as shown in simulation 103, a user 101 exits an elevator and walks along a path towards door 126E. The simulation 103 includes beacons 110B, 110C, 110D, and 110E for detecting the presence of user 101's client device 102.

As user 101 travels along the path toward door 126E, the beacons 110B and 110C transmit wireless beacon messages to the client device 102. In response to receiving the wireless beacon messages from the beacons 110B and 110C, the client device 102 transmits data indicating its current context including the wireless beacon messages to the access server 104. The access server 104 uses the data indicating the client device 102's current context to determine whether the user 101 corresponding to the client device 102 is authorized to access doors 126A through 126E. In addition, the access server 104 uses the data indicating the client device 102's current context to predict whether the user 101 is likely to access doors 126A through 126E. In particular, the access server 104 provides data indicating the client device 102's current context to a trained neural network model to produce a likelihood whether the user 101 is likely to access a particular door. The access server 104 compares the likelihood from the trained neural network model to a threshold to predict whether the user 101 is likely to access a particular door. If the likelihood is greater than the threshold and the access server 104 determines one or more other conditions are met, e.g., user's speed, approach, path of movement, and current time of day, match the current conditions, the access server 104 provides access data to the particular door to unlock and/or open the particular door. Alternatively, if the likelihood is less than the threshold, then the access server 104 will not unlock or open the particular door for the user.

For example, as shown in simulation 103, the access server 104 produces an indication that user 101 is not likely to access door 126A, door 126B, door 126C, and door 126D. The access server 104 predicts that the user 101 is not likely to access door 126A because user 101 typically accesses door 126A at a different time of day. The access server 104 predicts that the user 101 is not likely to access door 126B because user 101 is walking in the wrong direction away from door 126B. The access server 104 predicts that the user 101 is not likely to access door 126C and 126D because user 101 is walking slowly past door 126C as compared to when user 101 typically walks to access door 126C. Similarly, the access server 104 determines that user 101 is walking too fast past door 126D as compared to when user 101 typically walks to access door 126D. However, the access server 104 does produce an indication that the user 101 is likely to access door 126E. As a result, the access server 104 transmits instructions to the door 126E to open, allow user 101 to access for a period of time, and close the door 126E after the period of time elapses. As a result, the access server 104 can concurrently determine and provide access to resources for various different users.

FIG. 2 is a block diagram 200 that illustrates an example of data used to predictively provide access to a resource. The access database 106 stores previous data attempts 202 and historical data 210. The access server 104 utilizes the previous data attempts 202 and the historical data 210 to train the neural network model to produce an indication or likelihood of whether a user is likely to access a particular resource. The previous data attempts 202 illustrate a user's attempt or non-attempt at accessing a particular resource, such as a door, for example. The previous data attempts 202 illustrate one or more paths taken by a user to a particular resource. The historical data 210 illustrates motion data of the user along a path to a particular resource.

Previous data attempts 202 include illustration A 204, illustration B 206, and illustration C 208. Each of these illustrations show various methods by which a user attempts or does not attempt to access a particular resource. For example, the various methods include different paths taken by a user to access a particular resource. Illustration A 204 shows a user walking along path 205 from an elevator to access a particular door. The illustration A 204 includes a path 201 for the same user not accessing the door. The illustration A 204 also includes a path 203 taken by a user in an opposite direction to paths 201 and 203 that show the user walking away from the particular resource. In other implementations, the paths 201 and 203 show different users walking down the hallway at the same time as the user walking along path 205. This allows the trained neural network model to distinguish the user walking along path 205 from the other users. In illustration B 206, a user walks along a path 207 from the elevator without attempting to access any of the doors. In addition, the user walks in an "S" like manner along path 207—thus indicating to the trained neural network model, that when this user typically walks in the "S"-like manner, the user is unlikely to access any of the resources.

In illustration C 208, the user walks from the elevator along path 213 to access a particular resource. Illustration C 208 also shows the same user walking along path 211 and 209. In path 211, the user walks in the opposite direction of path 213. In path 209, the user starts at the elevator, makes a left turn, a right turn, then another right turn while passing the particular resource. The paths of 209 and 211 indicate how the user does not attempt to access the particular resource. The access server 104 can use the previous data attempts 202 to train the neural network model to indicate whether a user is likely to access the particular resource or not access the particular resource. For example, the access server 104 can use the previous data attempts 202 to train the neural network model to produce a statistical likelihood that indicates whether the user is likely to access the particular resource or not.

Historical data 210 shows illustration D 212, illustration E 214, and illustration F 216. The historical data 210 illustrates characteristics of a user's motion toward a particular resource. The access server 104 can use the characteristics of the user's motion along with data indicating whether the user in fact accessed the particular resource to determine whether the characteristics indicate the user intends to access the particular resource For example, the characteristics of the user's motion may indicate deceleration or acceleration along the path toward a particular resource, a width of a user's path, that denotes user's turning along a path, that is consistent with attempts to access the particular resource, and movement representing obstacle avoidance along a path toward the particular resource. As shown in illustration D 212, a user moves along a path 215 from an elevator to access a particular resource. Along path 215, the user initially walks at a speed of 2 mph away from the elevator and at a particular point along path 215, the user decelerates to a speed of 0.5 mph. The user decelerating to 0.5 mph can indicate to the access server 104 that the user will access the particular resource, such as the door, as indicated by the "Yes" label above the door. The access server 104 can use the data from this example to train the neural network model to recognize that when a user decelerates in front of a particular resource, the user is likely access this particular resource.

In illustration E 214, a user moves along a path 217 in order to access a particular resource. A user can move along path 217 by turning, changing direction, and be within a width of the path 217 that still represents an approach to access the particular resource. The system can use examples of this variability from one access attempt to the next access attempt to accurately predict likelihood of access. The access server 104 can use the user's turning, change in direction along path 217, or movement within a width of path 217 to train the neural network model to recognize that the user is still likely to access the particular resource even though the user varies his movement along the width of path 217. Said another way, the user can move along path 217 with varying movements along a predetermined width of path 217 towards the particular resource and the neural network model can be trained to recognize that paths with this level of variation can still represent approaches in order to access the particular resource. Then, once the neural network model is sufficiently trained, the access server 104 can determine that a likelihood exists that the user no longer intends to access the particular resource if the user moves outside the width of the path 217, e.g., walking outside the width of path 217.

In illustration 216, a user moves along path 219 to a particular resource and avoids one or more obstacles along the way. The client device transmits information regarding the context of the client device to the access server 104 while in the beacon device's zone of detection. The access server 104 determines from the received information regarding the context of the client device that the user, while traveling along path 219, made a right turn, a left turn, another left turn, and another right turn. In some implementations, the access server 104 can determine that this movement indicates that the user intended to avoid an obstruction along path 219.

In some implementations, the access server 104 can indicate locations of known obstructions when training the neural network model. The trained neural network model can then learn to recognize movement patterns that represent obstacle avoidance while continuing on a path to access the particular resource. By recognizing instances of obstacle avoidance, the trained neural network model and the access server 104 can distinguish between obstacle avoidance movements while remaining on course to a resource and movements that bypass the resource.

Figure 3:
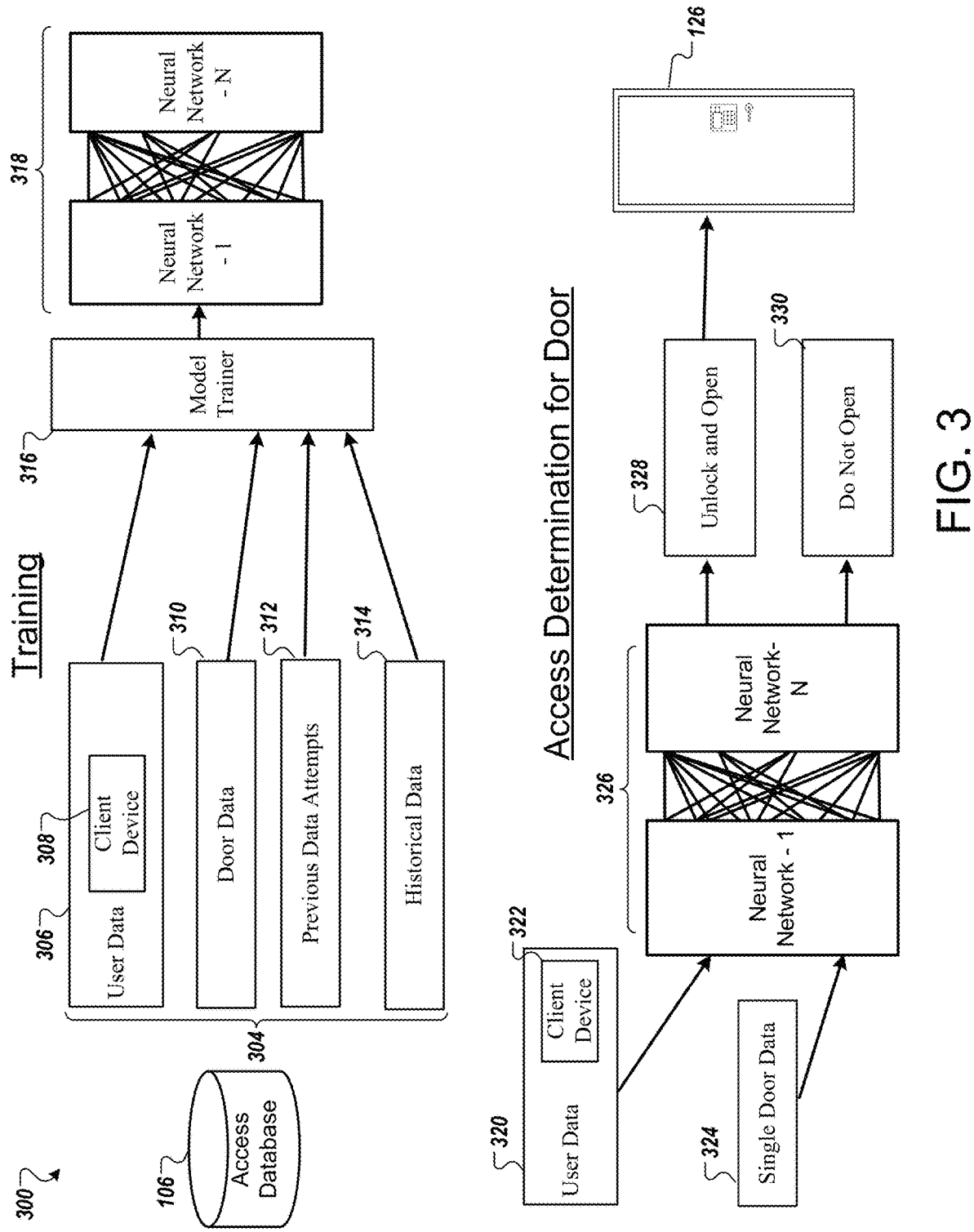
FIG. 3 is a block diagram that illustrates an example of operations to predictively provide access to a resource.

FIG. 3 is a block diagram 300 that illustrates an example of operations to predictively provide access to a resource. Briefly, and as described in more detail below, the system 300 illustrates the training phase for a model that is configured to generate an indication of whether a user is likely to access a particular resource. The system 300 also illustrates the usage of the model in providing unlock and open instructions to a particular resource, such as a door, when the trained model produces the indication that the user is likely to access the door. In some implementations, the access server 104 of FIG. 1 may train and apply the model.

As illustrated in the training phase of FIG. 3, the model trainer 316 receives data 304 from the access database 106.

In some implementations, the data 304 retrieved from access database 106 used by model trainer 316 can include user data 306, client device data 308, door data 310, previous data attempts 312, and historical data 314. The user data 306 can include a name of the user, a classification level of the user, an employee level of the user, and credentials of the user. The credentials of the user include a username and password of the user for logging into the client device.

The client device data 308 can include data representing the client device. The data can include a telephone number of the client device, a MAC address of the client device, and an indication of the user that corresponds to the client device. The door data 310 can include data that represents the particular resource, such as a door. For example, the data of the door data 310 can be a door that includes an identification of the door, an IP address of an Ethernet card connected to the door that communicates with a processor that communicates with the hinges and a lock of the door, and a location of the door. The previous data attempts 312 can be data similar to previous data attempts 202. In some implementations, the previous data attempts 312 can correspond to data for a particular user. In other implementations, the previous data attempts 312 can correspond to data for a particular door. The model trainer 316 can retrieve the previous data attempts 312 from the access database 106 based on the user or based on the door. As previously mentioned, the previous data attempts 312 include attempts and non-attempts of a user accessing a particular resource. For example, the previous data attempts 312 include one or more various paths taken by a user to access a particular resource.

The historical data 314 can be data similar to historical data 210. In some implementations, the historical data 314 can correspond to data for a particular user. In other implementations, the historical data 314 can correspond to data for a particular user accessing a particular resource. In other implementations, the historical data 314 can correspond to data for a particular user accessing multiple resources. Still, in other implementations, the historical data 314 can correspond to data for how a particular user does not access multiple resources. As previously mentioned, the historical data 314 illustrates characteristics of a user's motion that indicate the user's likelihood of accessing a particular resource. For example, the characteristics of the user's motion may indicate his deceleration or acceleration along the path toward the resource of interest, how far he varies his movement from the path, and how he avoids obstacles along a path to move toward a resource. In addition, the historical data can illustrate characteristics of a user's motion that indicate the user's intention to not access one or more resources.

As an example, the model trainer 316 may retrieve data 304 from the access database 106 that show examples of approaches when the user 101 accessed the door 126. The model trainer 316 can seek to train the neural network model 318 to produce an indication or likelihood that indicates when user 101 will attempt to access door 126. The access server 104 can then use the produced indication or likelihood to detect or predict a future instance when user 101 will attempt to access door 126. The model trainer retrieves user data 306 corresponding to user 101 that includes the user's name, credentials, access level, and a high security access level. The client device data 308 includes the telephone number for client device 102, MAC address for client device 102, and an indication that client device 102 corresponds to user 101. The door data 310 includes data that represents the door 126 that includes an IP address of 1.1.1.2 of the Ethernet card that connects to the door 126 that communicates with a processor that communicates with the hinges and lock of the door 126. The previous data attempts 312 and the historical data 314 include data of user 101 previously attempting to access door 126. In some implementations, the previous data attempts 312 and the historical data 314 includes data of user 101 not attempting to access door 126. By providing data that indicates how the user does not attempt to access door 126, the neural network model 318 can distinguish between a user approaching in order to access the door 126 and a user coming near the door and not accessing the door 126.

The model trainer 316 uses this data from the access database 106 to train a neural network model 318 or any other type of machine learning model. The neural network model may include an input layer, an output layer, and one or more hidden layers. The model trainer 316 may use a machine learning technique to continually or repeatedly train the model 318, e.g., in an ongoing manner, as the system 300 receives more data when applying the model.

As illustrated in the access determination for a door selection phase of FIG. 3, the system 300 applies the trained model 326 to determine whether a user is likely to access a particular resource. The system 300 may apply the trained model 326 to the particular resource in response to a user's client device being detected by a beacon device within proximity to the particular resource. In some implementations, the access server 104 of FIG. 1 may apply the trained model 326 and use its output to produce an instruction whether to unlock, open, or lock the particular resource.

The access server 104 receives user data 320. The user data 320 includes client device data 322. The user data 320 includes information describing user 101 and client device data 322. The client device data 322 indicates that the client device 102 has obtained a beacon device message in a particular location. The particular location can include one or more resources, such as doors, lockers, or light switches, to name a few examples. In some implementations, the client device 102 can transmit this information to the access server 104 in system 300 each time the client device 102 receives a beacon message from the beacon device. In other implementations, after the first instance of the beacon device and the client device 102 detecting one another, the client device 102 transmits the client device data 322 to the access server 104 on a periodic basis. The periodic basis can be every minute or every hour.

The access server 104 can also obtain data from the access database 106 to incorporate in the user data 320. The obtained data can also include characteristics that describe one or more previous approaches by the user for accessing a secure resource. For example, the one or more previous approaches can include a time of day of a previous access to the secured resource by the user, a speed of movement of the client device during an approach leading to access to the secured resource by the user, and an acceleration of the client device during an approach leading to access to the secured resource by the user. Additionally, the one or more previous approaches can include a direction of movement of the client device during an approach leading to access to the secured resource by the user, an orientation of the client device during an approaching leading to access to the secured resource by the user, a path traveled by the client device as the travel device during an approaching leading to access to the secured resource by the user, a sequence of location beacons detected by the client device during an approach leading to access to the secured resource by the user, and a signal strength of communications with the location beacons during an approach leading to access to the secured resource by the user. In some implementations, the user data 320 can each of these characteristics or one or more of these characteristics. The access server 104 can retrieve each of these characteristics from the access database 106 and from the data provided by the client device corresponding to the user.

The access server 104 also receives single door data 324. The single door data 324 is similar to door data 310. In some implementations, the access server 104 analyzes the received client device data 320 to determine the single door data 324. For example, the single door data 324 includes the beacon message the client device 102 received from the beacon device. The access server 104 analyzes the beacon message to determine which particular resources are within proximity to the beacon device. For example, door 126, door 126A, and door 126B may be within proximity to the beacon device 110C. If client device 102 were to detect beacon messages from beacon device 110C and provide user data 320, including beacon message from the beacon device 110C, to the access server 104, the access server 104 could determine that the beacon message came from beacon device 110C, which is in proximity to doors 126, 126A, and 126B. For example, the access server 104 can use the beacon message ID, such as ID: 0254, as an index to look up the resources within proximity to the corresponding beacon device. In other implementations, the beacon message can indicate the resources that are within the zone in which messages beacon device can be detected. For example, the beacon message ID, such as ID: 0254, includes the doors 126, 126A, and 126B that is within the zone of detection of beacon device 110C.

The access server 104 applies the user data 320 and the corresponding single door data 324 to the trained neural network model 326. The trained neural network model 326 generates a statistical likelihood or a likelihood score. The access server 104 compares that statistical likelihood to a threshold to determine whether the user is likely to access the particular resource. For example, the trained neural network model 326 generates a statistical likelihood of 75%. The access server 104 compares that statistical likelihood of 75% to a predetermined threshold of 50%, for example, to make the determination. In some examples, the access server 104 can set the predetermined threshold to be higher, so the access server 104 produces a higher confidence decision. In other examples, the access server 104 can set the predetermined threshold to be lower. Continuing with the example, based on the access server 104's comparison of 75% to the predetermined threshold of 50%, the access server 104 can decide to unlock or open the particular resource, from the single door data 324. In some examples, the trained model 326 may generate, for the particular user with respect to a particular door, a likelihood score of 0.4. The access server 104 can compare the likelihood score of 0.4 to an indication threshold that determines whether the user will access the particular resource. For example, the indication threshold can be 0.75 and above. If the likelihood score produced by the trained model 326 is greater than the indication threshold, the access server 104 can generate an indication to provide to the particular resource to unlock and open the particular resource.

The access server 104 generates unlock and open instructions 328 if the access server 104 determines the trained neural network model 326's likelihood is greater than the predetermined threshold. The access server 104 generates the unlock and open instructions 328 to provide to the particular resource. The unlock and open instructions 328 includes an ID of the particular resource, an indication to unlock the particular resource, an indication to open the particular resource, a length of time for the particular resource to remain open, and an indication as to when to close the particular resource. For example, the access server 104 generates the unlock and open instructions 328 to provide to the door 126. The access server 104 transmits the unlock and open instructions 328 to the door 126.

In some implementations, the access server 104 can receive feedback from the user if the access server 104 produces an incorrect indication. When the system predicts that a user will open a door and predictively unlocks it, but the user does not access the door within a period of time, the system can use the user's approach as an example that should not be considered an attempt to gain access if a similar situation is detected in the future. Similarly, when a user approaches a door and the system does not predictively unlock it, but the user does enter credentials or take other action to gain access, the system may use this as an example of an access attempt, and the system may incrementally learn to open for the user in a similar situation in the future. In some implementations, when the system does not automatically unlock a door for a user, the user can interact with an application on the client device 102 to indicate that the door should have opened for the current approach.

The model trainer 316 may receive feedback from the system 300. The feedback may be similar to the data used to train the model 318. The access server 104 may provide the feedback to the model trainer 316 to tune the trained model 326. For example, the system 300 may use the trained model 326 and the access server 104 to produce an indication that the user intends to access a particular resource. The system 300 may receive data indicating that the user did not in fact access the particular resource when the access server 104 produced an instruction to unlock and/or open the particular resource. The model trainer 316 may use the parameters of the user data, the client device data, the door (resource) data, previous data attempts, and historical data and the actual result of the user not accessing the particular resource to update the trained model 326.

FIG. 4 is a flowchart that illustrates an example of a process 400 to predictively provide access to a resource. A computer system, such as an access server, may perform the process 400.

The access server receives movement data indicating movement of a mobile device associated with a user while the mobile device approaches a secured resource (402). The client device of a user may move in an environment toward a particular resource. The particular resource can be a door, a locker, or another locked device. A beacon device may exist in proximity to the particular resource. The beacon device may transmit a wireless message to the client device. The client device can receive the wireless message and transmit the wireless message, historical data, and reference data to the access server. The historical data includes accelerometer data and GPS data that indicate speed, acceleration, and location of the client device over a predetermined period of time. Additionally the historical data includes current contextual data of the client device, such as its current GPS locations.

The reference data can include an identifier of the client device, user login data of the user, one or more passwords for the user to login to the client device, and data indicating what resources the user is authenticated to access.

The access server receives the wireless message, the historical data, and the reference data. The access server can use the wireless message to determine the client device's location relative to the corresponding beacon device. For example, the wireless message can include an identifier and a signal strength of the wireless message that indicates the corresponding beacon device and distance between the client device and the beacon device. The access server can determine from the received wireless message that the client device is within proximity to a particular secured resource, such as a door, because the beacon device is situated near the particular secured resource. In some implementations, the access server periodically receives wireless messages from the client as the user moves closer or farther away from the beacon device.

For example, the access server can utilize the speed, acceleration, and location data of the client device along with the determination that the client device is near a particular resource, moving towards the particular resource, or moving away from a particular resource to determine whether to provide the user access to the particular secured resource.

The access server determines that a credential of the user authorizes access to the secured resource (404). For example, the access server receives the credentials of the user in the reference data and determines whether the credentials are recognized. The access server compares the received credentials of the user, e.g., username and password, to known credentials stored in the access database connected to the access server. If the access server determines a match exists, the access server determines that a user of the client device is authorized to access the secured resource.

Based on the movement data, the access server classified the movement of the mobile device as corresponding to an attempt to access the secured resource ( Before the user interacts with the secured resource, the access server causes the secured resource to be unlocked or opened in response to (i) determining that the credential of the user authorizes access to the secured resource, (ii) classifying the movement of the mobile device as corresponding to an attempt to access the secured resource, and (iii) determining that the mobile device is in proximity to the secured resource (410). Before the user interacts with the secured resource, the access server generates a message to provide to the secured resource and transmits the message to the secured resource. The message instructs the secured resource to unlock, lock, or open, based on a type of the particular resource. The access server can act to unlock, lock, or open the resourced based on timing constraints. For example, the access server can transmit the unlock and open message to the resource such that the resource performs the unlock and open functions one second before the user accesses the particular resource. In other examples, the access server can transmit the unlock and open message to the resource such that the resource performs the close and lock functions two seconds after the user accesses the particular resource. Other times are possible.

In some implementations, the access server operates under timing constraints based on use history of the user, current distance from the particular resource, and speed of the user (client device). For example, the access server can determine from historical data that the user typically opens a particular resource five seconds after the resource has been unlocked. In another example, the access server can determine that the user walks through the door three seconds after the access server transmits a notification to the door to unlock and open. Thus, the access server may transmit the notification to the particular resource three seconds before the user is expected to access the particular resource to precisely time the user's accessing of the resource. Alternatively, the access server may transmit the notification to the particular resource five seconds before the user is expected to access the particular resource to ensure the user is not waiting for the particular resource to unlock or open.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

Figure 5:
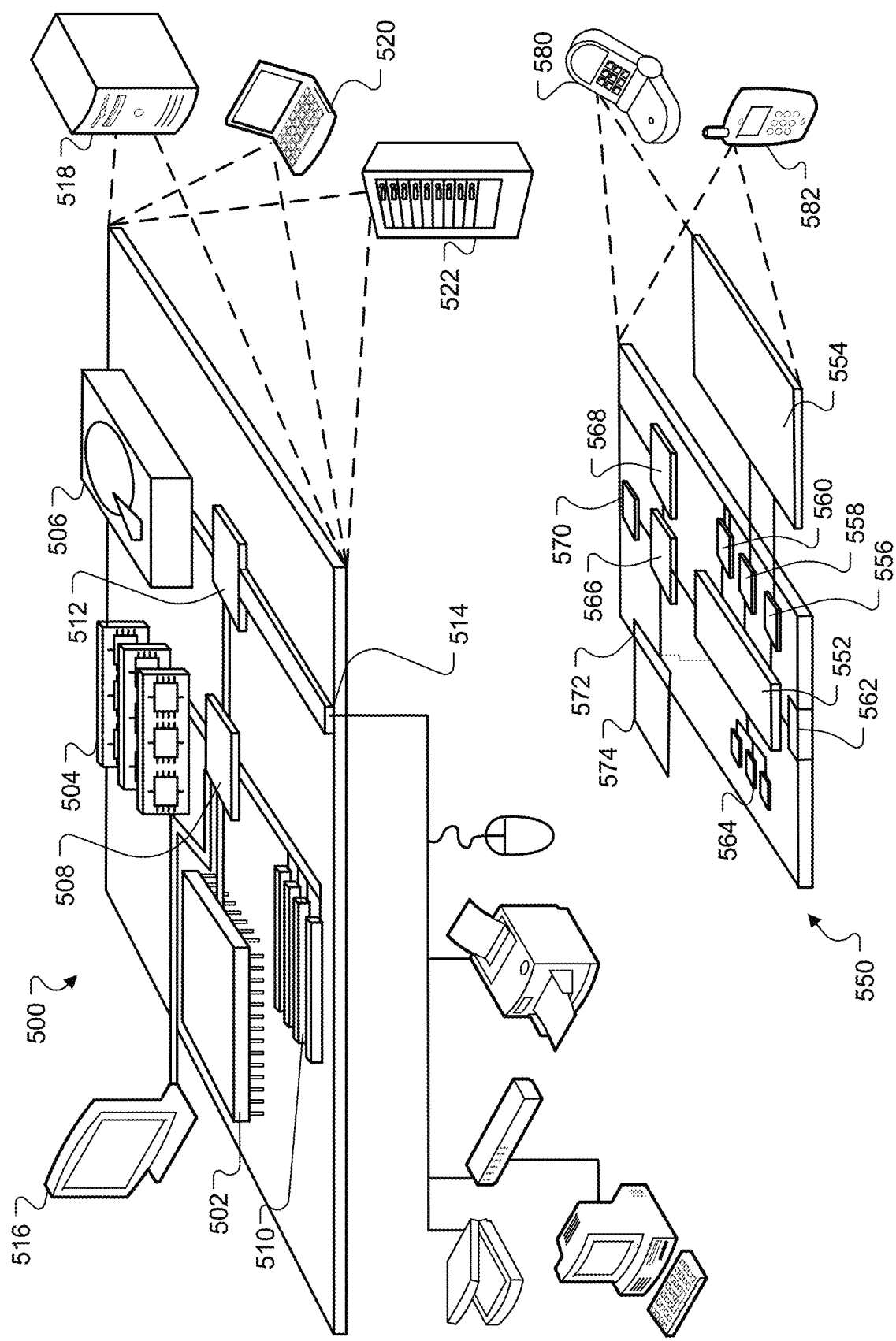
FIG. 5 shows an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 518, or multiple times in a group of such servers. In addition, it may be implemented in a personal computer such as a laptop computer 520. It may also be implemented as part of a rack server system 522. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computing devices, the method comprising:
receiving, by the one or more computing devices, movement data indicating movement of a mobile device associated with a user while the mobile device travels on a path approaching a physical location of a secured resource, the movement data indicating positions of the mobile device as the mobile device travels on the path;
authenticating, by the one or more computing devices, the user and determining that a credential of the user authorizes access to the secured resource;
classifying, by the one or more computing devices, the movement of the mobile device as indicating an attempt to access the secured resource, including:

generating, by the one or more computing devices, an access likelihood score based on the movement data, wherein the access likelihood score indicates a predicted likelihood that the user will attempt to access the secured resource;

determining that a similarity between the path travelled by the mobile device approaching the physical location of the secured resource and one or more previous paths taken by the user that resulted in the user accessing the secured resource or one or more other secured resources satisfies similarity criteria; and in response to determining that the similarity between the path travelled by the mobile device approaching the physical location of the secured resource and the one or more previous paths taken by the user that resulted in the user accessing the secured resource or one or more other secured resources satisfies similarity criteria and that the access likelihood score satisfies a threshold, classifying the movement of the mobile device as indicating an attempt to access the secured resource;

determining, by the one or more computing devices, that the mobile device is in proximity to the physical location of the secured resource; and before the user interacts with the secured resource, causing the secured resource to be unlocked or opened in response to (i) authenticating the user and determining that the credential of the user authorizes access to the secured resource, (ii) classifying the movement of the mobile device as indicating an attempt to access the secured resource, and (iii) determining that the mobile device is in proximity to the physical location of the secured resource.

2. The method of claim 1, comprising determining that the user is currently authenticated using the mobile device;
wherein causing the secured resource to be unlocked or opened is based on determining that the user is currently authenticated using the mobile device.

3. The method of claim 1, wherein the one or more computing devices are a server system;
wherein causing the secured resource to be unlocked or opened comprises sending, by the server system and over a computer network, access data that causes the secured resource to unlock or open itself in response to receiving the access data.

4. The method of claim 1, wherein the secured resource is a door, locker, machine, electronic device, or vehicle.

5. The method of claim 1, wherein the movement data comprises data identifying wireless beacons detected by the mobile device at different points in time while the mobile device approaches the physical location of the secured resource, wherein the movement data indicates times and signal strengths with which messages from the beacons were received by the mobile device.

6. The method of claim 1, wherein the movement data indicates sensor data from an accelerometer, inertial measurement unit, or compass of the mobile device.

7. The method of claim 1, wherein generating the access likelihood score comprises:
providing, as input to a trained machine learning model, feature values generated from the movement data, wherein the trained machine learning model is configured to classify whether movement patterns represent a resource access attempt; and
receiving the access likelihood score as an output that the trained machine learning model provides in response to receiving the feature values as input.

8. The method of claim 7, wherein the trained machine learning model is a trained artificial neural network.

9. The method of claim 7, wherein the trained machine learning model has been trained based on (i) a plurality of training examples respectively indicating movement patterns that resulted in a user accessing the secured resource or any of the one or more other secured resources and (ii) a plurality of training examples indicating movement patterns that did not result in a user accessing any secured resources.

10. The method of claim 1, wherein determining that the mobile device is in proximity to the secured resource comprises determining that mobile device is within a predetermined distance of the secured resource based on a signal strength of a communication between the mobile device and a location beacon device that is located at a predetermined location with respect to the secured resource.

11. The method of claim 1, wherein classifying the movement of the mobile device as indicating an attempt to access the secured resource is further based on a similarity between (i) characteristics of a current approach to the physical location of the secured resource by the user and (ii) characteristics of one or more previous approaches,
wherein the characteristics of the current approach to the physical location of the secured resource by the user comprise at least one of:
a current time of day,
a current speed of movement of the mobile device,
a current acceleration of the mobile device,
a current direction of movement of the mobile device,
a current orientation of the mobile device,
a sequence of location beacons detected by the mobile device as the mobile device approaches the physical location of the secured resource, or
a signal strength of communications with the location beacons;
wherein the characteristics of the one or more previous approaches comprise at least one of:
a time of day of a previous access to the secured resource by the user,
a speed of movement of the mobile device during an approach leading to access to the secured resource by the user,
an acceleration of the mobile device during an approach leading to access to the secured resource by the user,
a direction of movement of the mobile device during an approach leading to access to the secured resource by the user,
an orientation of the mobile device during an approach leading to access to the secured resource by the user,
a sequence of location beacons detected by the mobile device during an approach leading to access to the secured resource by the user, or
a signal strength of communications with the location beacons during an approach leading to access to the secured resource by the user.

12. The method of claim 1, comprising determining, based on the movement data, (i) the path that the mobile device has travelled while the mobile device approaches the physical location of the secured resource, the path being determined based on identifiers for location beacons from which the mobile device received beacon messages while approaching the physical location of the secured resource and signal strengths at which the beacon messages were received, (ii) speed and acceleration of the mobile device at multiple positions along the path, (iii) a current location of the mobile device, and (iv) a current speed and direction of the mobile device;
  wherein classifying the movement of the mobile device further comprises:
    comparing (i) the speed and acceleration of the mobile device along the path with (ii) the speed and acceleration of the mobile device along the one or more previous paths taken by the user that resulted in the user accessing the secured resource; and
    comparing a time of the approach to the physical location of the secured resource with one or more times that the user previously accessed the secured resource;
  wherein the method includes determining, based on the current location, speed, and direction of the mobile device, a time to cause the secured resource to be unlocked or opened, wherein the secured resource is caused to be opened at the determined time by sending an instruction to the secured resource that specifies the determined time or sending an instruction to the secured resource at the determined time.

13. A system comprising:
one or more computing devices; and
one or more computer-readable media storing instructions that, when executed by the one or more computing devices, cause the one or more computing devices to perform operations comprising:
receiving, by the one or more computing devices, movement data indicating movement of a mobile device associated with a user while the mobile device travels on a path approaching a physical location of a secured resource, the movement data indicating positions of the mobile device as the mobile device travels on the path;
authenticating, by the one or more computing devices, the user and determining that a credential of the user authorizes access to the secured resource;
classifying, by the one or more computing devices, the movement of the mobile device as indicating an attempt to access the secured resource, including:
generating, by the one or more computing devices, an access likelihood score based on the movement data, wherein the access likelihood score indicates a predicted likelihood that the user will attempt to access the secured resource;
determining that a similarity between the path travelled by the mobile device approaching the physical location of the secured resource and one or more previous paths taken by the user that resulted in the user accessing the secured resource or one or more other secured resources satisfies similarity criteria; and
in response to determining that the similarity between the path travelled by the mobile device approaching the physical location of the secured resource and the one or more previous paths taken by the user that resulted in the user accessing the secured resource or one or more other secured resources satisfies similarity criteria and that the access likelihood score satisfies a threshold, classifying the movement of the mobile device as indicating an attempt to access the secured resource;
determining, by the one or more computing devices, that the mobile device is in proximity to the physical location of the secured resource; and
before the user interacts with the secured resource, causing the secured resource to be unlocked or opened in response to (i) authenticating the user and determining that the credential of the user authorizes access to the secured resource, (ii) classifying the movement of the mobile device as indicating an attempt to access the secured resource, and (iii) determining that the mobile device is in proximity to the physical location of the secured resource.

14. One or more non-transitory computer-readable media storing instructions that, when executed by one or more computing devices, cause the one or more computing devices to perform operations comprising:
receiving, by the one or more computing devices, movement data indicating movement of a mobile device associated with a user while the mobile device travels on a path approaching a physical location of a secured resource, the movement data indicating positions of the mobile device as the mobile device travels on the path;
authenticating, by the one or more computing devices, the user and determining that a credential of the user authorizes access to the secured resource;
classifying, by the one or more computing devices, the movement of the mobile device as indicating an attempt to access the secured resource, including:
generating, by the one or more computing devices, an access likelihood score based on the movement data, wherein the access likelihood score indicates a predicted likelihood that the user will attempt to access the secured resource;
determining that a similarity between the path travelled by the mobile device approaching the physical location of the secured resource and one or more previous paths taken by the user that resulted in the user accessing the secured resource or one or more other secured resources satisfies similarity criteria; and
in response to determining that the similarity between the path travelled by the mobile device approaching the physical location of the secured resource and the one or more previous paths taken by the user that resulted in the user accessing the secured resource or one or more other secured resources satisfies similarity criteria and that the access likelihood score satisfies a threshold, classifying the movement of the mobile device as indicating an attempt to access the secured resource;
determining, by the one or more computing devices, that the mobile device is in proximity to the physical location of the secured resource; and
before the user interacts with the secured resource, causing the secured resource to be unlocked or opened in response to (i) authenticating the user and determining that the credential of the user authorizes access to the secured resource, (ii) classifying the movement of the mobile device as indicating an attempt to access the secured resource, and (iii) determining that the mobile device is in proximity to the physical location of the secured resource.

15. The method of claim 1, wherein classifying the movement of the mobile device is based in part on a similarity between the path travelled by the mobile device and previous paths taken by multiple users that resulted in access to the secured resource, wherein the path travelled by the mobile device and the previous paths taken by the multiple users each comprise a sequence of physical locations.

16. The method of claim 1, wherein classifying the movement of the mobile device is based in part on a similarity between the path travelled by the mobile device and previous paths taken by multiple users that resulted in access to any of multiple secured resources, wherein the path travelled by the mobile device and the previous paths taken by the multiple users each comprise a sequence of physical locations.

17. The method of claim 1, wherein causing the secured resource to be unlocked or opened before the user interacts with the secured resource comprises causing the secured resource to be unlocked or opened at a time that is:
- before the user arrives at the secured resource;
- before the user requests access to the secured resource;
- before the user attempts to access the secured resource; and
- before the user presents a credential to the secured resource.

18. The method of claim 1, wherein the path travelled by the mobile device and the one or more previous paths taken by the user each comprise a sequence of physical locations; and
- wherein the movement of the mobile device is classified as indicating an attempt to access the secured resource based on a comparison of (i) the sequence of physical locations in the path travelled by the mobile device with (ii) the sequence of physical locations in at least one of the one or more previous paths travelled by the mobile device.

\* \* \* \* \*